(12) United States Patent
Bubulka et al.

(10) Patent No.: US 7,914,244 B2
(45) Date of Patent: Mar. 29, 2011

(54) FASTENER WITH ZONED, VARYING WAVE-FORM THREAD

(75) Inventors: John S. Bubulka, Westchester, IL (US); Joel M. Thomas, Melrose Park, IL (US); Kavithas Ponnampalam, Westchester, IL (US); Jeffrey L. Trzaskus, Evanston, IL (US); Kenneth R. Levey, West Chicago, IL (US); Robert K. Dutzi, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 370 days.

(21) Appl. No.: 12/018,516

(22) Filed: Jan. 23, 2008

(65) Prior Publication Data

US 2009/0092461 A1     Apr. 9, 2009

Related U.S. Application Data

(60) Provisional application No. 60/977,126, filed on Oct. 3, 2007.

(51) Int. Cl.
  *F16B 39/30* (2006.01)

(52) U.S. Cl. .......................... 411/307; 411/938

(58) Field of Classification Search .......... 411/307–311, 411/938, 386–387.4
  See application file for complete search history.

(56) References Cited

U.S. PATENT DOCUMENTS

| | | | | |
|---|---|---|---|---|
| 756,269 A | * | 4/1904 | McMahon | 411/285 |
| 1,070,247 A | * | 8/1913 | Haines | 411/259 |
| 2,349,592 A | * | 5/1944 | Hosking | 411/311 |
| 3,196,918 A | * | 7/1965 | Hampton | 411/311 |
| 3,381,733 A | * | 5/1968 | Stanwick | 411/311 |
| 3,481,380 A | * | 12/1969 | Breed | 411/309 |
| 3,523,565 A | * | 8/1970 | Olsen | 411/309 |
| 3,661,194 A | | 5/1972 | Macfarlane et al. | |
| 3,885,613 A | * | 5/1975 | Evans | 411/311 |
| 3,918,345 A | | 11/1975 | Phipard, Jr. | |
| 3,927,503 A | * | 12/1975 | Wilson | 411/311 |

(Continued)

FOREIGN PATENT DOCUMENTS

SU      800446      1/1981

(Continued)

OTHER PUBLICATIONS

International Search Report and Written Opinion for PCT/US2008/071409.

(Continued)

*Primary Examiner* — Flemming Saether
(74) *Attorney, Agent, or Firm* — Mark W. Croll; Paul F. Donovan

(57) ABSTRACT

A threaded fastener includes a shank having a tip and a head configured for engagement by an associated driving tool. The fastener is configured for use with an associated threaded opening. The head is disposed on the shank opposite the tip. The shank has a helical thread formed thereon. The thread extends from about the tip to about the head and defines a plurality of zones. Each zone has a plurality of individual threads extending 360 degrees about the shank. A leading thread in each zone is formed with a wave-form profile having an amplitude that is greater than the amplitude of each prior leading thread. In one embodiment, threads other than the leading thread in each zone do not have an amplitude as great as their respective leading threads. A fastening assembly is also disclosed.

20 Claims, 4 Drawing Sheets

U.S. PATENT DOCUMENTS

| | | | |
|---|---|---|---|
| 4,040,328 A | 8/1977 | Muenchinger | |
| 4,112,812 A | 9/1978 | Wardwell et al. | |
| 4,194,430 A | 3/1980 | Muenchinger | |
| 6,349,466 B1 | 2/2002 | Redler et al. | |
| 6,464,439 B1 * | 10/2002 | Janitzki | 411/308 |
| 2005/0238459 A1 | 10/2005 | Levey et al. | |

FOREIGN PATENT DOCUMENTS

| | | |
|---|---|---|
| WO | WO 2005103511 | 11/2005 |

OTHER PUBLICATIONS

Taptite Threading Rolling Screws—Inch Dimensions ( 4 Pages), Nov. 1984.

* cited by examiner

FASTENER WITH ZONED, VARYING WAVE-FORM THREAD

CROSS-REFERENCE TO RELATED APPLICATION DATA

The present application claims the benefit of priority of U.S. provisional Patent application Ser. No. 60/977,126, filed Oct. 3, 2007.

BACKGROUND OF THE INVENTION

The present invention relates generally to threaded screw fasteners, and more particularly to a new and improved threaded screw fastener or clamping screw that has a varying wave form in the helical thread pattern.

Simple threaded fasteners include male and female threaded components that engage one another to secure multiple items to each other. Threaded fasteners are used in widely differing applications, environments and conditions for widely varying purposes. Fasteners can be made of many different materials, both soft and hard, including various metals and plastics.

Thread patterns may vary, but typically they are based on a straight-line helix pattern. Thread pitch may vary from one type or size of fastener to another, and may even vary on different portions of the same fastener. The pitch of the male thread is typically provided at equal to or less than a basic pitch, and the female thread is typically provided at equal to or more than the basic pitch. As such, the male thread generally "floats" within the female thread, allowing the two components to be run together throughout the thread length with little or no interference until clamping pressure is applied during final tightening of the fastener.

It is known to provide threaded connections for use in electrical bus bars and connection terminals on, for example, electrical components, panel boards and the like. A wire is inserted into an aperture (terminal opening) and secured in the aperture by a clamping screw that is threaded into a transverse (threaded) opening. The screw binds the wire against the side of the aperture, opposite the threaded opening.

Often the bus bars or connection terminals (terminal strips or blocks) will have multiple connections on a single terminal strip. Clamping screws are provided on the terminal strip for one or more of the threaded openings that thread into the aperture.

When an electrical device is manufactured, it may include multiple terminal strips for terminating electrical conductors to the device. Screws are usually preinstalled and screwed all the way down into in their respective threaded apertures to prevent inadvertent loosening of the screws. In order to make the connections, the user must back-out each screw from its threaded opening a sufficient distance to insert the wire or electrical conductor through the aperture. The screw is then re-tightened to clamp the wire in place. This is a time consuming and labor intensive task.

One way to save time and cost is to have the screws only partially threaded into the terminal strip to preclude backing out the screws before inserting the wire. However, conventional screws will generally be loose in the threaded openings and, as such, may inadvertently back or fall out of the mating hole. This further increases installation time when the user or installer must find and place the lost screw or another screw in the threaded opening and then clamp the wire in place.

Clamp screws are known that provide an interference fit in the threaded opening to prevent inadvertent back-out. One such screw provides an anti hack-out feature when the screw is partially threaded into the opening, which then decreases when the screw is threaded sufficiently beyond the interference feature. While this may function in a satisfactory manner for certain applications, there are conditions under which decreasing the back-out force (which also results in a decrease in the insertion torque required) is not desired. For example, such an arrangement may not permit reusing the connection arrangement or permit use of the connection arrangement with different gauge conductors (wires).

Accordingly, there is a need for a new threaded fastener that addresses the foregoing problems and other problems of known fasteners. More particularly, there is a need for a new threaded fastener that provides the desired amount of back-out torque and insertion torque for a chosen application. There is a further need for a new threaded fastener that is capable of being installed in a pre-assembly position, that is configured to remain secured to the mating member while in the preassembly position, and that is adapted to be further threaded into the mating member to a final position under the appropriate insertion torque. More specifically, there is a need for a new threaded fastener for use in securing electrical connectors (wires) in terminal strips and blocks. Desirably, such a fastener provides an interference fit in a threaded opening that intersects the aperture into which the wire or connector is inserted. Such a fastener provides a desired amount of torque to tighten the fastener into the opening, while also maintaining the desired torque-tension relationship during the fastening sequence. Such a fastener is maintained tight in the threaded opening to facilitate efficient use of preassembled field ready components. Such a fastener is also reusable and is usable with different sizes (gauges) of wire.

BRIEF SUMMARY OF THE INVENTION

A fastener with a zoned, varying wave thread form is provided. The threaded fastener is configured for use with an associated threaded opening, such as an opening in an electrical terminal strip or block. The fastener includes a shank having a tip and a head configured for engagement by an associated driving tool. The head is disposed on the shank opposite the tip.

The shank has a helical thread formed thereon. The thread extends from about the tip to about the head, and defines a plurality of zones. Each zone includes a portion of the thread defined by the number of revolutions of the thread about the shank.

A leading thread in each zone is formed with a wave-form profile having an amplitude that is greater than the amplitude of each prior leading thread. Threads other than the leading thread in each zone have the same or a lesser amplitude than their associated leading thread.

A fastening assembly utilizing a threaded fastener as described herein is also disclosed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings and illustrations, wherein.

DETAILED DESCRIPTION OF THE INVENTION

Figure 1:
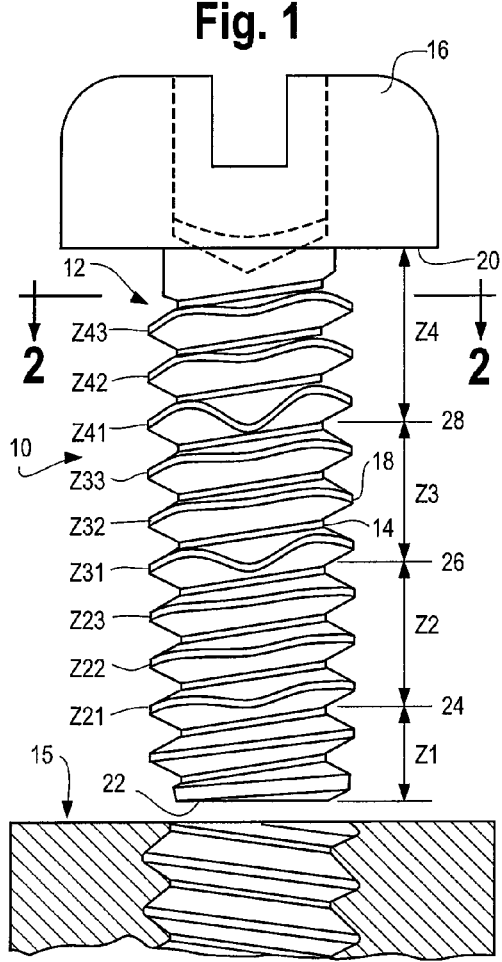
FIG. 1 is a plan view of a screw having a zoned, varying wave-form thread embodying the principles of the present invention, the screw being shown in an exploded view in a threaded terminal block opening.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown a threaded fastener assembly 10 having a threaded fastener 12 and a female component 15 into which the fastener 12 is threaded. The female component appears to have a "reversed" thread, however, it will be appreciated that the component 15 is shown in cross-section and as a result, the thread in the rear half of the component 15 is shown. The fastener 12 can be, for example, a clamp screw, having zoned, varying wave-form thread, embodying the principles of the present invention. The screw 12 includes generally a cylindrical shank 14 and a head 16. The illustrated fastener head 16 is a slotted head, however, it will be appreciated that the head can be in many forms to permit driving the screw, including a hexagonal drive engagement, a Phillips-head drive, a square drive, Torx drive, or other drive configuration. Moreover, the fastener may be a set screw of other threaded arrangement that does not specifically have a head, provided the fastener includes a means for being driven.

The thread formation 18 extends generally from the underside 20 of the head to a tip 22. The thread is of a helical formed conventional (symmetrical) thread cross-section. In order to provide an interference fit with a constant or slightly increasing driving torque requirement throughout the thread length, the thread is formed with a varying amplitude wave-form profile. That is, the thread, if unwound from the shank, would form a varying sine wave pattern. The variations occur in two distinct groups. First, the shank of the screw is divided into a number of zones with each zone having a number of thread rotations, and second, the thread in each region has differing wave-form characteristics.

For example, the screw can be divided into four zones (zones 1-4) with the first zone (zone 1 or Z1) extending from the tip 22 to a point along the shank (a first transition 24), the second zone (zone 2 or Z2) extending from the first transition 24 to a second point along the shank (a second transition 26), the third zone (zone 3 or Z3) extending from the second transition 26 to a third point along the shank (a third transition 28) and the fourth zone (zone 4 or Z4) extending from the third transition 28 to the head 16 of the screw 12.

Figure 2:
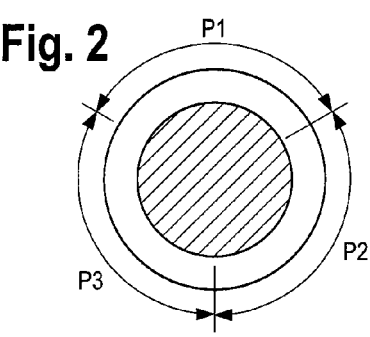
FIG. 2 is a cross-sectional view taken along line 2-2 in FIG. 1.
Figure 3:
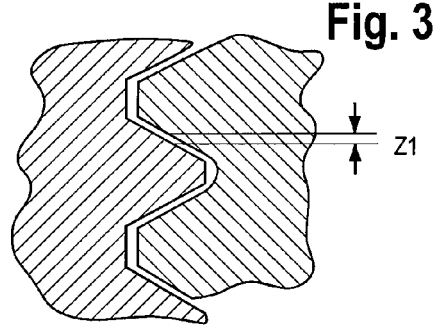
FIGS. 3-6 are enlarged, partial sectional illustrations of the interaction of the screw and opening threads.
Figure 4:
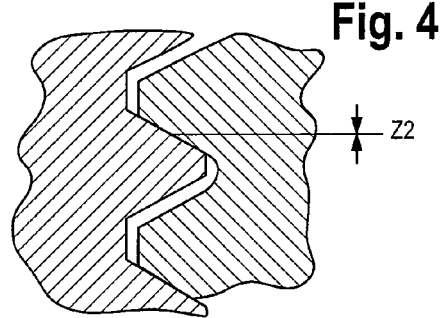
Figure 5:
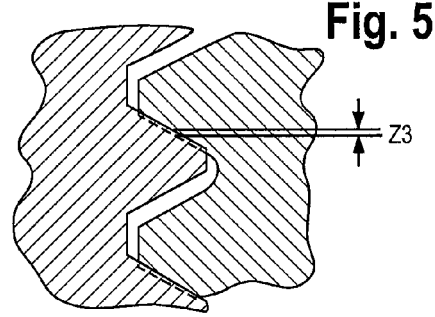
Figure 6:
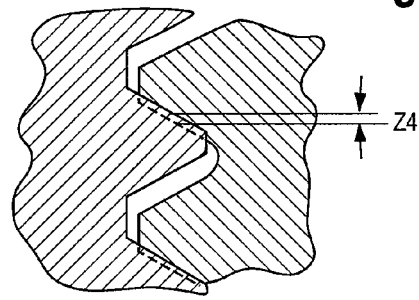

Next, each zone is divided into individual revolutions of the thread, with zones 2-4 including a leading revolution of the thread Z21, Z31, Z41 and one or more trailing revolutions of the threads Z22, Z23; Z32, Z33; and Z42, Z43. In a screw according to the present invention, each of zones 2-4 has one leading revolution of the thread and two trailing revolutions of the thread (for a total of three revolutions of the thread per zone). For purposes of this disclosure and discussion, each "thread" is defined as the thread form in a 360 degree rotation about the shank (see FIG. 2). As such, a thread will start and end at the same radial location along the shank 14.

Each of the threads is formed with a wavy pattern, such as a sine wave pattern, as it progresses along the helix. That is, from a starting point to an ending point of a single thread (360 degree rotation around the shank), the thread is formed in a sine wave pattern. In a present screw, each thread has three sine waves formed therein. That is, from the starting point to the ending point of any given thread, there are three sine waves or three full periods, (see e.g., P1, P2 and P3 in FIG. 2 and FIG. 12) formed in the thread, and each of the periods extends 120 degrees about the shank.

In an effort to prevent back-off and to assure that the required driving torque is constant or even increasing with increased (further) engagement, the sine wave of the leading thread Z21, Z31, Z41 in each zone Z2, Z3, Z4 has an amplitude A21, A31, A41 (see FIGS. 7A, 8A and 9A) that it greater than that of the sine wave of the leading thread of each prior zone. That is, the amplitude A31 of thread Z31 is greater than the amplitude A21 of thread Z31, and the amplitude A41 of thread Z41 is greater than the amplitude A31 or thread Z31.

Figure 7B:
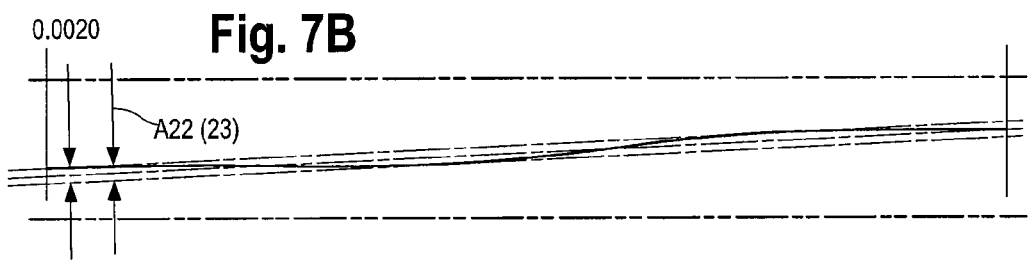
FIGS. 7A and 7B are portions of a thread profile of the first revolution of the thread (FIG. 7A) and the second and third revolution of the thread (FIG. 7B) in zone 2 of the screw as illustrated, for example, in FIG. 1.
Figure 7A:
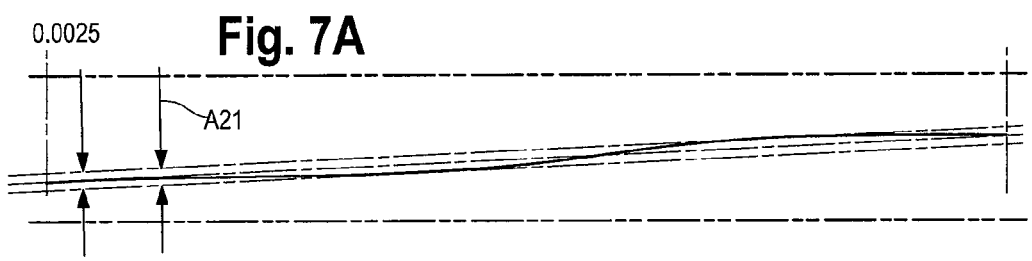
Figure 13:
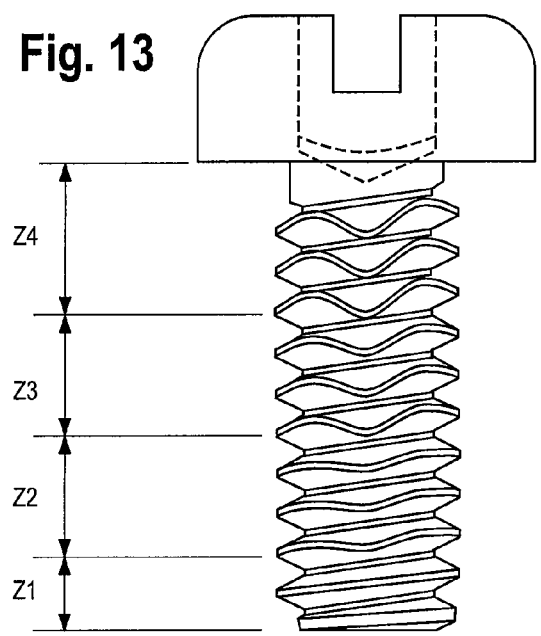
FIG. 13 shows a screw in which the threads in each zone have substantially the same wave form profile, and in which the wave periods are longitudinally aligned.

However, in order to minimize the required driving torque, the trailing threads (in a present embodiment, the second and third threads in each zone) can be formed having an amplitude that is less than the amplitude of the leading thread. For example, as seen in FIGS. 7A and 7B, trailing thread Z22 has an amplitude A22 that is less than the amplitude A21 of its leading thread Z21 (See FIGS. 7A and 7B). Alternately, of course, each of the threads of each zone can have the same amplitude as seen in FIG. 13. If desired, the trailing threads can be conventional threads (non-wave-form) as well.

In a present screw, zone 1 is a conventional non-wave form thread to facilitate readily commencing engagement (e.g., free running start) of the screw 12 with the terminal strip 15.

Zone 2 has a leading thread with a wave form and two trailing threads with wave forms that have amplitudes that are less than that of the leading thread. Likewise, zone 3 has a leading thread with a wave form that has an amplitude greater than the amplitude of the zone 2 leading thread. Zone 3 also has two trailing threads with wave forms that have amplitudes that are the same as the zone 2 trailing threads. And, zone 4 has a leading thread with a wave form that has an amplitude greater than the amplitude of the zone 3 leading thread and two trailing threads with wave forms that have amplitudes that are the same as the zone 2 and zone 3 trailing threads. Thus, the amplitudes of the leading threads in each zone are successively greater than previous leading thread amplitudes.

It will be appreciated that although the present screw has trailing threads in all zones that are equal, the trailing threads can vary by zone and within zones, in amplitude, so long as they are equal to or less than their respective leading threads.

Figure 11:
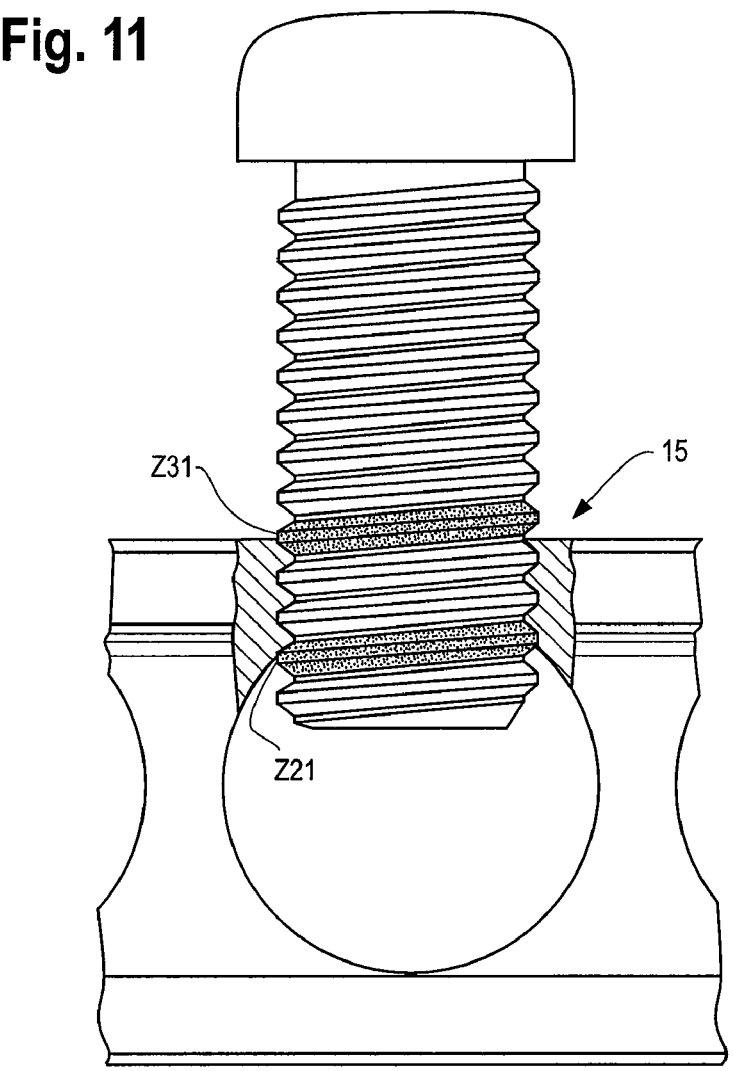
FIG. 11 is a view of the thread shown with a broken away view of the connector block, showing the positional relationship of the zone leading threads and the mating female component.

It will also be appreciated that the present screw 12 includes one leading thread and two trailing threads such that the entire zone (or at least three screw threads at a time) cooperate with the threaded opening 15 into which it is threaded. For example, referring to FIG. 11, the illustrated terminal strip includes three threads such that at any time during engagement of the screw 12 with the opening 15, the screw 12 has a leading thread (Z21, Z31) engaged with the opening 15. In the illustrated example, with the screw being threaded into the opening, the zone 2 leading thread Z21 is exiting the opening just as the zone 3 leading thread Z31 is entering the opening. Thus, at any given time, there is at least one leading thread engaged within the opening. In this manner, the required driving torque does not decrease because, as one leading thread exits the opening thread, a subsequent leading thread (which has a larger amplitude and thus increased interference) enters the opening thread.

Figure 9B:
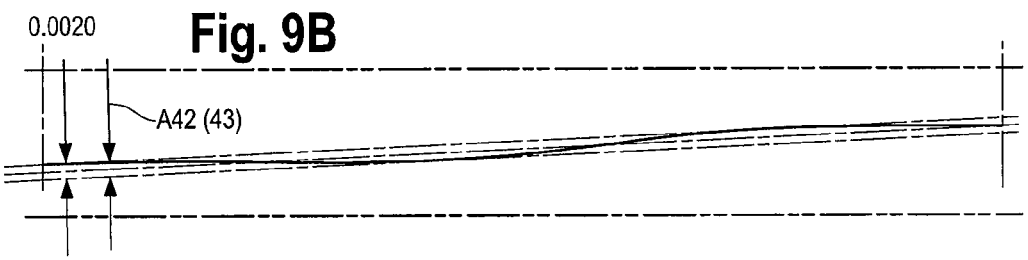
FIGS. 9A and 9B are portions of the thread profile of the first revolution of the thread (FIG. 9A) and the second and third revolution of the thread (FIG. 9B) in zone 4 of the screw.
Figure 9A:
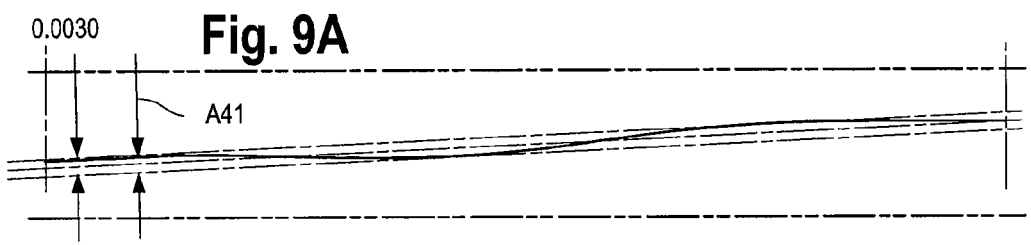
Figure 8B:
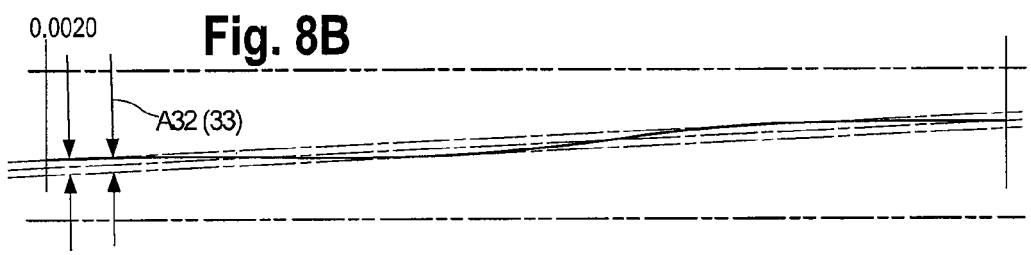
FIGS. 8A and 8B are portions of the thread profile of the first revolution of the thread (FIG. 8A) and the second and third revolution of the thread (FIG. 8B) in zone 3 of the screw.
Figure 8A:
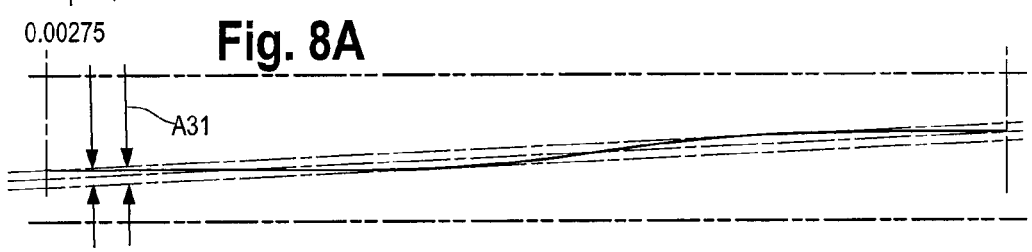

FIGS. 7-9 represent portions of a thread form for a screw according to the present invention. The dimensions are shown merely to help explain various aspects according to the present invention and are in no way intended to be limiting. The amplitude A21 of the zone 2 leading thread Z21 is shown as 0.0050 (0.0025×2) inches, the amplitude A31 of the zone 3 leading thread Z31 is shown as 0.0055 (0.00275×2) inches and the amplitude A41 of the zone 4 leading thread Z41 is shown as 0.0060 (0.0030×2) inches. The amplitude A22, A23, A32, A33, A42, A43 of the trailing threads Z22, Z23, Z32, Z33, Z42, Z43 is shown as 0.0040 (0.0020×2) inches in each of the zones. These FIGS. help illustrate the varying amplitudes according to the present invention. By way of further explanation, the noted measurements are based on a distance measured from what would be a standard thread form. A standard thread form is represented as the middle line in each FIG. 7-9. The measurement then, or so called amplitude, is the distance the wavy thread extends above and below what would be the standard thread form at the top (or bottom as the case may be) of the wave.

Figure 14:
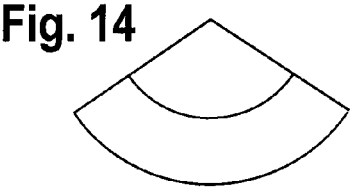
Figure 15:
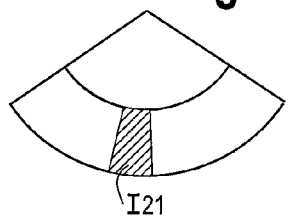

As can be seen in FIGS. 3-6, the increasing amplitude of the leading thread wave will "overlap" with the thread formation in the female component 15 (the terminal block opening). It will be appreciated that the material from which the female component is fabricated is generally a softer material and thus, by design, can be manipulated or, loosely speaking, deformed. A portion of the deformation may be in the elastic range and a portion may be in the plastic range. The overlap is further illustrated in FIGS. 14-17 which show the regions of interference between the screw zone leading threads and the mating female opening thread. In FIG. 14, the first zone (Z1) thread has a conventional, non-wavy profile (this zone provides for free running to initially insert the screw into the opening), and thus there is not interference. In FIG. 15, the thread in zone 2 (Z2), enters the mating opening thread and an area of interference 121 is created due to the initial wave amplitude A21. Friction increases resulting in the screw requiring more effort to drive in or loosen.

Figure 17:
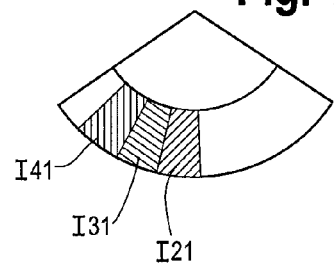
FIGS. 14-17 illustrate the increasing areas of interference between the screw thread and the mating female member as further zones of the screw are threaded into the female member.
Figure 16:
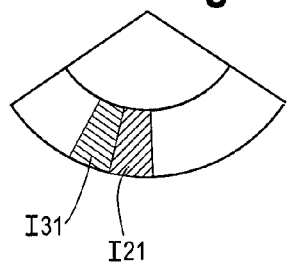

In FIGS. 16 and 17, the thread in zones 3 and 4 (Z3 and Z4), enter the mating opening thread and create even greater areas of interference 131, 141 due to the amplitudes (A31 and A41) of their respective threads Z31 and Z41. Friction increases even more than that developed as prior zones entered the mating thread. Explained differently, one can observe that the distance of engagement (e.g., interference) between the male and the female threads over the points of contact increase with each zone or increasing amplitude.

Figure 10:
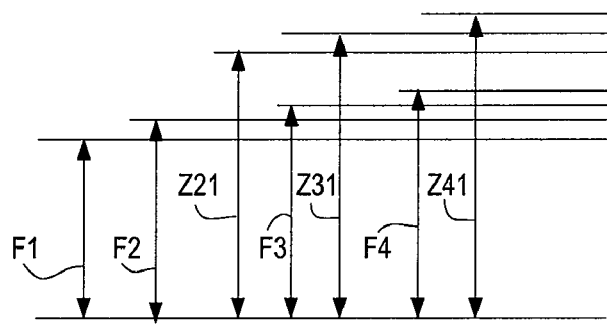
FIG. 10 is a schematic illustration of the interaction of a screw thread according to the present invention and a cooperating female threaded opening illustrating the plastic and elastic characteristics of the opening following engagement with the screw.

Now, turning to FIG. 10, a schematic illustration is provided to assist in understanding the interaction of the screw and opening threads and the plastic and elastic character of the materials and the opening threads. For purposes of the present description, only the leading threads Z21, Z31, Z41 on the screw 12 are shown, and the threads in the terminal strip or connector 15, the female component, are shown as F2, F3 and F4 as they are engaged by the leading threads Z21, Z31, Z41.

Because there is both an elastic and a plastic character to the female threads, the thread will "spread" or expand to accommodate the passing leading (male) thread, but will then "spring" back. Although the female thread will spring back, it will not return to its initial dimension, but to a slightly increased dimension. Even so, the final spring back dimension of the female thread after the male threaded fastener has been fully inserted and removed will be less than the dimension of the first wavy leading thread Z21. In this way, the same fastener or a different fastener of the same size can be reused or used in the same female opening.

For example, in FIG. 10, F1 represents the female thread prior to any engagement with the wave-form screw thread. As the zone 2 leading thread Z21 engages the female thread, the female thread will spread to accommodate the zone 2 leading thread Z21 amplitude. Once the zone 2 leading thread Z21 passes, the female thread will spring back or return to the dimension shown as F2. It will be appreciated that F2, while greater than the initial female thread dimension F1, is still less than the zone 2 leading thread Z21 dimension.

Next, as the zone 3 leading thread Z31 engages the female component, the female thread will expand to accommodate the leading male thread Z31 amplitude, but then will once again spring back to some intermediate dimension F3 which is less than the Z31 dimension, but is greater than F2. However, it will be appreciated that F3 is less than the Z21 dimension as well. Likewise, as the zone 4 leading thread Z4 engages the female component, the female thread will expand to accommodate the leading male thread Z41 amplitude, but then will once again spring back to some intermediate dimension F4 which is less than the Z41 amplitude, but is greater than F3.

It will also be appreciated that even at the greatest expansion and subsequent spring back of the female thread (to F4), to accommodate the zone 4 leading thread Z41, the female thread F4 is still less than the dimension of Z21, the zone 2 leading thread. As such, even though the opening has been "spread" and the driving torque may be decreased, the decrease is not so great as to make the assembly unusable. In other words, although another screw of the same dimension or the same screw once removed, when threaded into the same female opening as previously used, will have a slightly reduced drive-in torque (because of the slightly increased size for the associated female opening), the assembly still includes the desired interference fit and anti back-out characteristics according to the principles of the present invention.

Unlike known interference fit screw threads, the present screw 12 thread permits use of a single screw with different gauge wires. Known interference fit screws will have an increase in resistance at some initial point which then drops off (usually steeply) after the interference member or region has been overcome. As such, if the wire is too large or too small, the interference member may not have yet been overcome (with a too large wire), or it may have been overcome a significant number of rotations prior (with a too small diameter wire), and back off may occur.

The present screw 12, on the other hand is usable over a wide range of wire gauges because at any time in the engagement of the screw 12 with the thread (terminal strip 15), one of the leading threads Z21, Z31, Z41 is engaged with the strip threaded opening (see FIG. 11), thus the screw 12 will remain in place at any depth and provide the desired resistance to back off.

Moreover, because the interaction of the screw threads with the terminal strip threads (and that the pitch spread in the strip threads is still smaller than the zone 2 leading thread amplitude), the strip 15 is not rendered unusable after an initial or even repeated uses. Rather, because the strip 15 opening pitch (for example, F4 in FIG. 10) is still less than the amplitude of any of the leading threads Z21-Z41, the assembly (the screw and strip) retain the pre-threading capability as well as the ability to accommodate and secure wires of various sizes.

It will be appreciated that while the present screw is described as having 4 zones (one free running and three with wave form threads), any number of zones can be used. Likewise, while each zone and the cooperating threaded (strip) opening are described as having three threads each, any number of threads can be used so long as the number of threads in each zone and in the cooperating thread are coordinated such that at least one leading thread is present in the threaded opening.

Moreover, it will be appreciated that, as discussed above, although the trailing threads are described as having a wave-form thread, they need not have such a profile. Rather, these threads are generally non-active (at least as compared to the leading threads), and so long as they provide some threading means by which to engage the screw and the opening, the trailing threads can be of a conventional shape. Alternately, of course, as seen in FIG. 13, all of the threads in a zone can be the same as the other threads, so long as there is an increase from one zone to the next.

Figure 12:
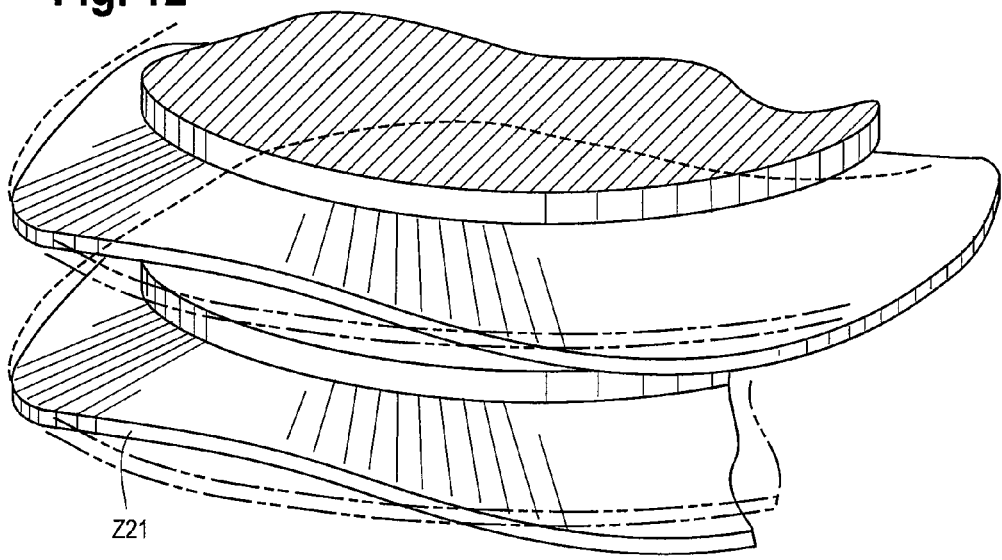
FIG. 12 is an illustration of the three-period wave form thread that shows, superimposed in phantom and for comparison purposes, a conventional helical thread form.

FIG. 12 illustrates the thread profile as having three periods per revolution. This provides for stability and axial alignment of the screw in the opening. Nevertheless, the number of periods can vary, so long as, preferably, the screw remains aligned in the opening and so long as, preferably, the screw is stable in the opening during engagement and disengagement. It will also be appreciated that the wavy thread form alternates engagement with the mating female opening between its pressure flank (the face of the thread closer to or facing the head) and its trailing flank (the face of the thread closer to of facing the tip). In other words, as shown, over a 360 degree revolution of the thread, the male thread engages the female thread at 3 locations along its pressure flank and 3 locations along its trailing flank. The number of engagements may vary consistent with the explanation above, but the alternating engagement between the pressure flank and the trailing flank is generally preferred.

As can be appreciated by one of ordinary skill in the art, the male threads do not fully engage the associated female threads over 360 degrees of rotation during drive-in as the drive-in torque would be too high for most applications. In standard thread forms, as noted above, there is generally some "float" between the male and female threads until the male is fully threaded to the female. A screw according to the present invention provides the desired interference fit to accommodate pre-installed assembly applications, while not having an undesirable drive-in torque (thus, the 3 or 6 points of contact over 360 degrees as compared to full contact), yet having the desired anti back-out torque as explained herein.

The illustrated screws all show axial alignment of the wavy portions of the thread from the tip to the head (similar to FIG. 1). It will, however, be appreciated by those skilled in the art that axial alignment is not necessary, so long as there is an increase in wave amplitude from zone to zone. Also shown are schematic representations to further illustrate the increased amplitudes of the threads and how this results in increased friction or engagement or drive-in torque or back-out force with the mating female.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A threaded fastener comprising:
a shank having a tip; and
a head disposed on the shank opposite the tip,
wherein the shank has a helical thread formed thereon, the thread extending from about the tip to about the head, and defining a plurality of zones, each zone having a plurality of individual threads extending 360 degrees about the shank, and wherein a leading thread in each zone is formed with a wave-form profile defined as a continuous sine wave pattern extending 360 degrees about the shank having an amplitude, such that starting with the leading thread closest to the head, each amplitude of each leading thread is greater than the amplitude of each prior leading thread which is closer to the tip.

2. The threaded fastener in accordance with claim 1, wherein threads other than the leading thread in each zone do not have an amplitude as great as their respective leading threads.

3. The threaded fastener in accordance with claim 1, wherein the amplitude of each leading thread is about 5 percent to about 30 percent greater than the amplitude of an immediately prior leading thread.

4. The threaded fastener in accordance with claim 1, wherein the threads other than the leading thread have a wave-form profile.

5. The threaded fastener in accordance with claim 1, including at least three leading threads.

6. The threaded fastener in accordance with claim 1, wherein the leading threads having about 3 wave periods per 360 degrees of rotation about the shank.

7. The threaded fastener in accordance with claim 1, wherein the wave-form profiles of the threads are axially aligned with one another.

8. A threaded fastener comprising:
a shank having a tip; and
a head disposed on the shank opposite the tip,
wherein the shank has a helical thread formed thereon, the thread extending from about the tip to about the head to define a plurality of individual threads each extending 360 degrees about the shank, and wherein at least two of the individual threads have a wave-form profile defined as a continuous sine wave pattern each having an amplitude, the wave-form profile threads spaced from one another by at least one thread, and wherein the wave-form profile thread nearer to the tip has an amplitude that is less than the wave-form profile of the thread nearer to the head.

9. The threaded fastener in accordance with claim 8, wherein the at least one thread between the wave-form profile threads is a wave-form profile thread that have an amplitude equal to or less than the amplitude of the wave-form thread nearer to the tip.

10. The threaded fastener in accordance with claim 8, wherein the at least one thread between the wave-form profile threads is a conventional thread profile.

11. The threaded fastener in accordance with claim 8, wherein the increase in amplitude of wave-form profile threads is about 5 percent to about 30 percent.

12. The threaded fastener in accordance with claim 8, wherein the wave-form profile threads have about 3 wave periods per 360 degrees of rotation about the shank.

13. The threaded fastener in accordance with claim 8, wherein the wave-form profiles of the wave-form profile threads are axially aligned with one another.

14. A fastening assembly comprising:
a threaded fastener having a shank with a tip and a head configured for engagement by an associated driving tool, the head disposed on the shank opposite the tip, the shank having a helical thread formed thereon, the thread extending from about the tip to about the head, and defining a plurality of zones, each zone having a plurality of individual threads extending 360 degrees about the shank, and wherein a leading thread in each zone is formed with a wave-form profile defined as a continuous sine wave pattern over the entire 360 degrees thereby defining an amplitude, such that starting with the leading thread closest to the head, each amplitude of each leading thread is greater than the amplitude of each prior leading thread which is closer to the tip; and
a female component for threadedly receiving the threaded fastener, the female component having an expandable helical thread formation that is capable of having a final dimension after receiving the threaded fastener that is less than the smallest of the amplitudes of the wave-form profile threads, such that a pressure flank and a trailing flank of each leading thread of the threaded fastener are configured to alternately engage the helical thread of the female component.

15. The fastening assembly in accordance with claim 14, wherein threads other than the leading thread in each zone do not have an amplitude as great as their respective leading threads.

16. The fastening assembly in accordance with claim 14, wherein threads other than the leading thread in each zone do not have an amplitude.

17. The fastening assembly in accordance with claim 14, wherein the amplitude of each leading thread is about 5 percent to about 30 percent greater than the amplitude of an immediately prior leading thread.

18. The fastening assembly in accordance with claim 14, wherein the threads other than the leading thread have a wave-form profile.

19. The fastening assembly in accordance with claim 14, including at least three leading threads.

20. The fastening assembly in accordance with claim 14, wherein the threaded fastener and the female component are configured such that at any time during engagement of the fastener and the female component, once a leading thread is threaded into the female component, one of the leading threads is always engaged with the female component.

* * * * *